US012599534B2

(12) United States Patent
Kitao

(10) Patent No.: US 12,599,534 B2
(45) Date of Patent: Apr. 14, 2026

(54) AIR PUMP DEVICE WITH WIRELESS COMMUNICATION

(71) Applicant: TECHNO TAKATSUKI CO., LTD., Takatsuki (JP)

(72) Inventor: Masaya Kitao, Takatsuki (JP)

( * ) Notice: Subject to any disclaimer, the term of this patent is extended or adjusted under 35 U.S.C. 154(b) by 673 days.

(21) Appl. No.: 18/065,624

(22) Filed: Dec. 14, 2022

(65) Prior Publication Data

US 2023/0258170 A1 Aug. 17, 2023

(30) Foreign Application Priority Data

Feb. 17, 2022 (JP) ................................ 2022-022727

(51) Int. Cl.
*A61H 9/00* (2006.01)

(52) U.S. Cl.
CPC ......... *A61H 9/0078* (2013.01); *A61H 9/0007* (2013.01); *A61H 9/0092* (2013.01); *A61H 2201/1238* (2013.01); *A61H 2201/1409* (2013.01); *A61H 2201/5007* (2013.01); *A61H 2201/5035* (2013.01); *A61H 2201/5056* (2013.01); *A61H 2201/5097* (2013.01)

(58) Field of Classification Search
CPC .... A61H 9/00–0092; A61H 2201/1238; A61H 2201/1409; A61H 2201/5007; A61H 2201/5035; A61H 2201/5056; A61H 2201/5097; A61H 23/00–06
USPC .......................................................... 601/150
See application file for complete search history.

(56) References Cited

U.S. PATENT DOCUMENTS

| | | | | |
|---|---|---|---|---|
| 6,884,255 | B1 * | 4/2005 | Newton | F04B 49/065 606/202 |
| 7,591,796 | B1 * | 9/2009 | Barak | A61H 9/0078 601/152 |
| 10,893,998 | B2 | 1/2021 | Ramanan et al. | |
| 2004/0127937 | A1 * | 7/2004 | Newton | A61H 9/0078 606/202 |
| 2014/0094725 | A1 | 4/2014 | Malhi et al. | |
| 2014/0094726 | A1 * | 4/2014 | Malhi | A61F 13/08 601/152 |
| 2014/0291979 | A1 * | 10/2014 | Shih | F16L 37/56 285/120.1 |
| 2015/0305969 | A1 * | 10/2015 | Giraud | A61H 7/005 601/84 |
| 2019/0133872 | A1 | 5/2019 | Chase et al. | |
| 2019/0133873 | A1 * | 5/2019 | Chase | A61F 13/08 |

(Continued)

FOREIGN PATENT DOCUMENTS

| | | | |
|---|---|---|---|
| EP | 0992230 A2 * | 4/2000 | A61H 9/0078 |
| EP | 1008336 | 6/2000 | |

(Continued)

OTHER PUBLICATIONS

Extended Search Report in corresponding European Application No. 22213050.2 dated Jun. 28, 2023.

*Primary Examiner* — Paige Kathleen Bugg
(74) *Attorney, Agent, or Firm* — SHIPWAY IP

(57) ABSTRACT

An air pump device for a massage device includes a recognition device to acquire a type of the massage device via a wireless communication with an identification device of the massage device, and a controller to set an operation pattern based on the type of the massage device. The controller controls a pump connectable to an inflatable bladder of the massage device, based on the operation pattern.

20 Claims, 8 Drawing Sheets

(56) References Cited

U.S. PATENT DOCUMENTS

| | | | | |
|---|---|---|---|---|
| 2021/0322240 | A1* | 10/2021 | Squitieri | A61B 5/0015 |
| 2026/0021012 | A1* | 1/2026 | Chase | A61H 9/0078 |

FOREIGN PATENT DOCUMENTS

| | | |
|---|---|---|
| EP | 1722738 | 4/2013 |
| EP | 3160415 | 9/2021 |
| JP | H9-285511 | 11/1997 |
| JP | 3059634 | 7/1999 |
| JP | 2603758 | 3/2000 |
| JP | 2606740 | 1/2001 |
| JP | 2607226 | 5/2001 |
| JP | 2004-535844 | 12/2004 |
| JP | 4332385 | 9/2009 |
| JP | 5745580 | 7/2015 |
| JP | 2018-533396 | 11/2018 |
| JP | 2020-049006 | 4/2020 |
| JP | 2020-526265 | 8/2020 |
| JP | 2021-502152 | 1/2021 |
| WO | 02/055005 | 7/2002 |
| WO | 2015/200203 | 12/2015 |
| WO | 2017/062959 | 4/2017 |
| WO | 2019/006092 | 1/2019 |
| WO | 2019/090338 | 5/2019 |
| WO | 2020/205329 | 10/2020 |
| WO | 2021/225109 | 11/2021 |

* cited by examiner

AIR PUMP DEVICE WITH WIRELESS COMMUNICATION

CROSS-REFERENCE TO RELATED APPLICATION

This application is based upon and claims the benefit of priority from Japanese Patent Application No. 2022-022727, filed on Feb. 17, 2022, the entire contents of which are incorporated herein by reference.

BACKGROUND

Air massagers may include a sleeve that expands by receiving a gas and that contracts by exhausting a gas and a gas supply device that supplies and exhausts gas to and from the sleeve. In such massage devices, various types of massage devices are provided for various massage sites and various massage methods, and operation patterns such as supply timing, supply amount, and order of gas from the gas supply device are determined for each type of massage device. In such a massage device, the user may select via a control device, an operation pattern corresponding to the connected massage device. However, such selection of the operation pattern may be troublesome for the user, and the user may make an erroneous selection such that an appropriate setting cannot be made.

JP 2020-049006 A1 discloses a massage control device that suspends the supply of compressed air from an air pump to a flow path when a measured pressure indicated by a pressure sensor measuring the pressure in the flow path extending from the pump to a connection port becomes equal to or higher than a predetermined initial set pressure, acquires the measured pressure indicated by the pressure sensor as a determination pressure value when a predetermined waiting time elapses after the supply of compressed air is suspended, and determines the type of massage device connected to the connection port based on the determination pressure value.

SUMMARY

In the above-described massage control device, since there is an individual difference in the sleeve, an erroneous determination may be caused or types of massage devices that can be determined (or identified) may be limited. Therefore, the type of massage device may be determined by a mechanical switch on a side of the gas supply device, for example, by providing a step on a side of the massage connected to the gas supply device. However, in this case, the durability of the mechanical switch may be decreased, and the massage control device may present a safety hazard to a user in a case where an erroneous determination is made due to a failure or the like. In addition, there is a limitation on the type of massage device that can be determined.

An air supply/exhaust device (or air pump device) according to an example of the present disclosure may supply and exhaust (release) a gas to and from a massage device including an identification unit (or identification device) configured to identify a type of the massage device, bladders configured to expand and contract in response to supply and exhaust of gas, and a communication path (or gas supply path) communicating with the bladders. The air supply/exhaust device includes a control unit (or control device or controller) configured to control supplying gas to and/or exhausting gas from the massage device in accordance with a preset operation pattern, and a recognition unit (or recognition device) configured to recognize the identification unit through wireless communication. The control unit specifies a type of the massage device based on the identification unit recognized by the recognition unit, and sets the operation pattern in accordance with the type of the identified massage device.

The recognition unit of the air supply/exhaust device having this configuration recognizes the identification unit provided in the massage device by wireless communication and may therefore prevent the type of the massage device from being erroneously determined due to a failure caused by mechanical wear or aging.

In addition, the method of recognizing the identification unit by wireless communication enables the determination of many types of massage devices that are readily connected, compared to determining the type by mechanically preparing a plurality of different shapes.

In some examples of the air supply/exhaust device, the control unit may store a plurality of operation patterns as setting candidates in accordance with the type of the identified massage device, and may be provided to be capable of receiving selection of one operation pattern from among a plurality of set operation patterns. In this configuration, a plurality of automatically selectable operation patterns are set based on the type of massage device specified by the control unit. The user can arbitrarily select a pattern from the plurality of set operation patterns.

In some examples of the air supply/exhaust device, the identification unit may have identification information for uniquely identifying an individual, the recognition unit may acquire the identification information by wireless communication, and the control unit may limit an operation pattern selectable from among the plurality of operation patterns in accordance with the acquired identification information. In this configuration, a plurality of operation patterns that can be automatically selected are set based on the type of massage device identified by the control unit, and operation patterns that can be selected (used) are limited based on identification information recognized by the recognition unit. Accordingly, for example, a function that can be used is set for each user having a different treatment way, to prevent an erroneous treatment (operation) from being performed.

In some examples, the air supply/exhaust device may further include a second connection part (or connection port) connectable to a first connection part (or connector) formed at an end part of the communication path, and the recognition unit may be provided to recognize an identification unit provided in the first connection part. In this configuration, since the identification unit of the massage device connected to the first connection part through the second connection part is recognized, the type of the massage device connected to the air supply/exhaust device can be identified.

In some examples of the air supply/exhaust device, the recognition unit may communicate with the identification unit through short-range wireless communication, and the recognition unit may be provided to recognize the identification unit in a state in which the second connection part is connected to the first connection part, and not to recognize the identification unit in a state in which the second connection part is not connected to the first connection part. In this configuration, the determination of whether or not the massage device is connected to the air supply/exhaust device enables the detection of an abnormality in a case where the massage device is detached during treatment.

In some examples of the air supply/exhaust device, the control unit may determine presence or absence of connection of the massage device to the second connection part, and may cause a notification unit to notify when it is determined that the connection is disconnected, based on presence or absence of identification of the identification unit by the recognition unit. In this configuration, the user can be notified that the massage device is detached.

In some examples, the air supply/exhaust device may further include a memory unit (storage device) configured to store a use state of the massage device connected to the second connection part through the first connection part. With this configuration, the usage status of the user and the state of the user corresponding to the usage status of the user may be stored.

In some examples of the air supply/exhaust device, a plurality of second connection parts may be provided, and the control unit may independently set the operation pattern for each massage device connected to each of the plurality of second connection parts. In this configuration, for example, each massage device may be attached to a different part of the body of the user to perform different operations, without using multiple air supply/exhaust devices.

DETAILED DESCRIPTION

Figure 1:
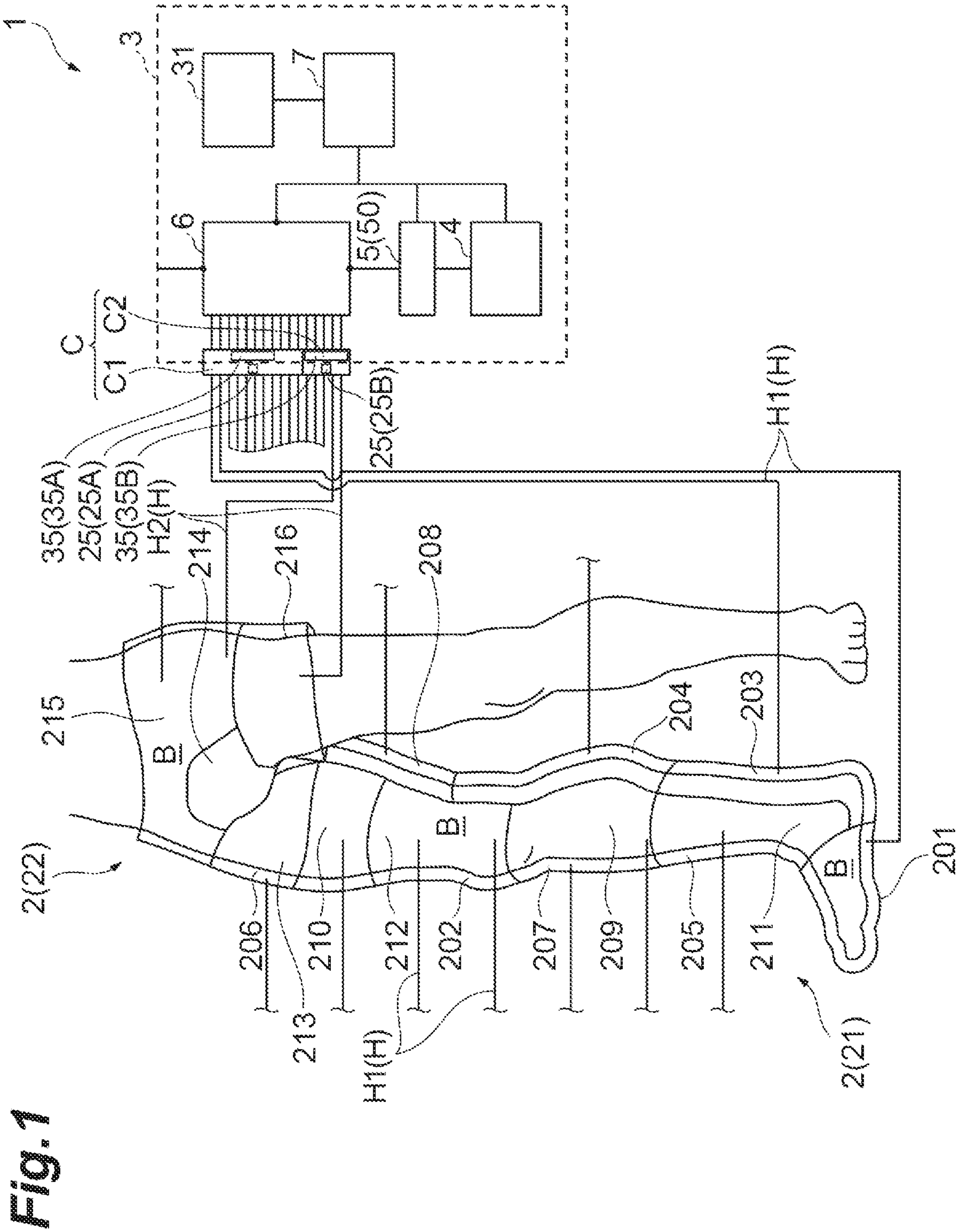
FIG. 1 is a schematic diagram of an example air supply/exhaust system and massage device that are connected together.

Hereinafter, an example air supply/exhaust device will be described with reference to the accompanying drawings. In the description of the drawings, the same elements are denoted by the same reference numerals, and redundant description will be omitted.

An example air massager system 1 includes device for massaging a body of a subject using high-pressure gas. The air massager is used to stimulate the body of the subject, for example, to "massage" the body of the subject for the purpose of improving the physical condition of the subject, such as improving the stagnation of veins and lymph of the subject and improving the flow of the veins and lymph. As used herein, the term "high-pressure gas" refers to a gas having an atmospheric pressure higher than the atmospheric pressure. In some examples, the gas is air from the viewpoint of convenience. However, the gas is not particularly limited, and may be an inert gas such as He (helium) and $N_2$ (nitride), and other gases such as $O_2$ (oxide).

As shown in FIG. 1, the air massager system 1 includes a massage device 2 and an air supply/exhaust system 3 connected to the massage device 2. The "connection" in some examples is not limited to a simple physical connection. For example, when a fluid such as a gas or a liquid flows between two devices through an intermediate member or air supply tube such as a hose, a tube, or a tank, the two devices are considered to be connected (fluidly connected) to each other.

Figure 2:
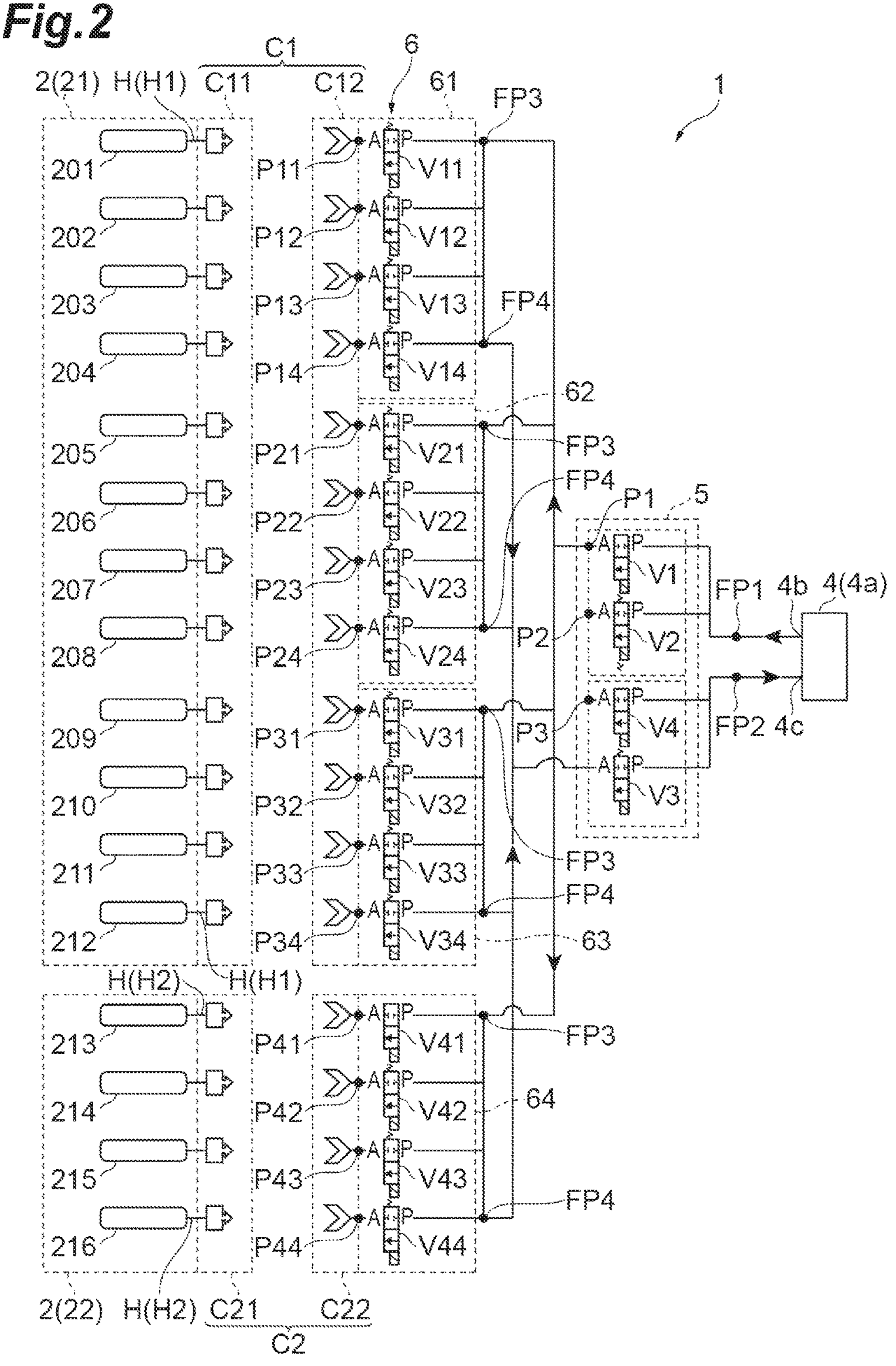
FIG. 2 shows a circuit diagram of an air supply/exhaust system.
Figure 3:
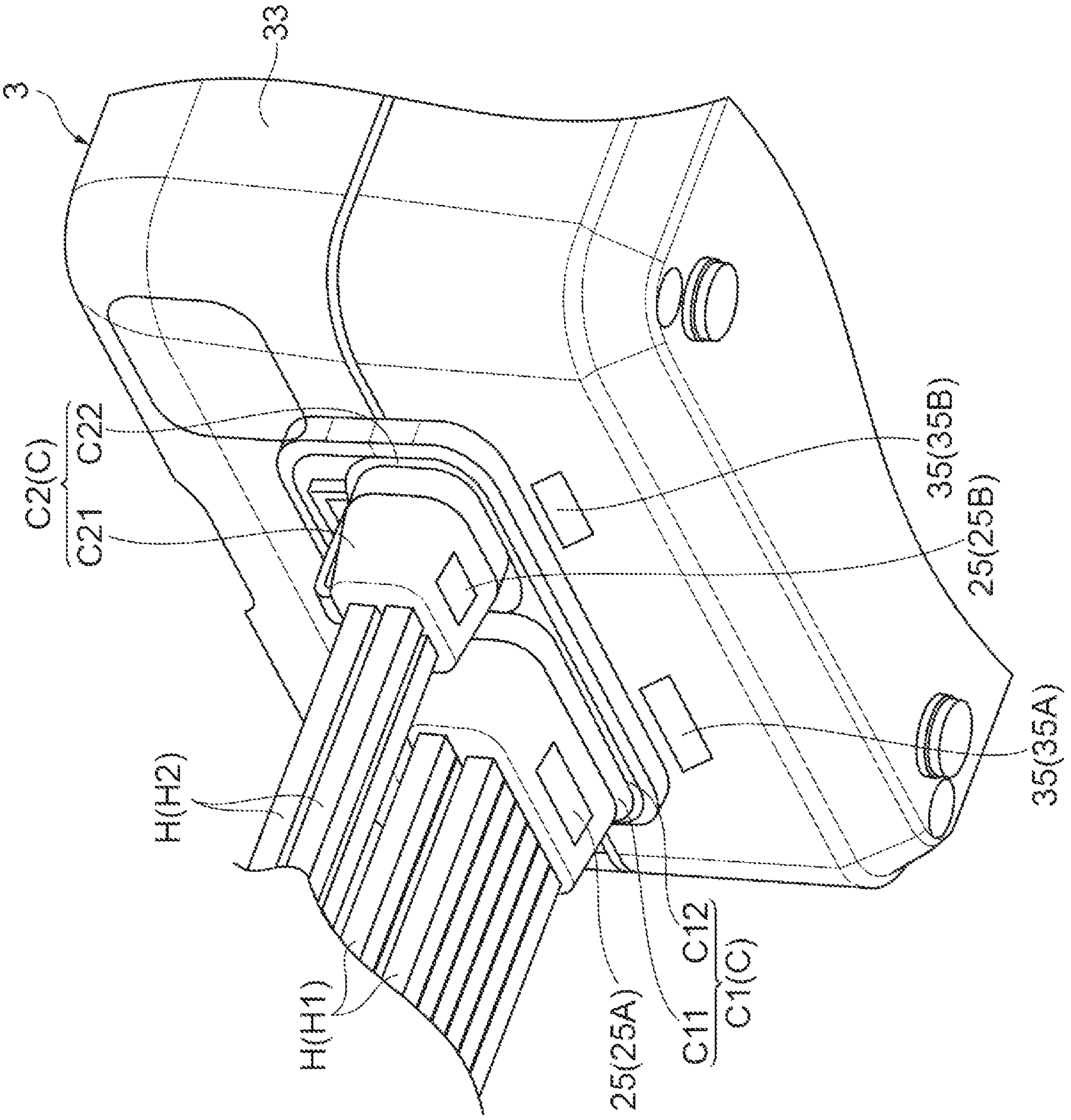
FIG. 3 is a perspective view illustrating a connection portion between an air supply/exhaust system and a massage device.

The massage device 2 is a device for massaging the body of a subject. The massage device 2 is connected to the air supply/exhaust system 3 (air supply/exhaust system or air pump system for a massage device) through a hose (air supply tube) H and a connector C as shown in FIG. 1. The massage device 2 expands by being supplied with high-pressure gas from the air supply/exhaust system 3, and contracts by being exhausted with high-pressure gas through the air supply/exhaust system 3. The massage device 2 compresses the body by expanding and releases the compression of the body by contracting. The massage device 2 massages the body of the subject by repeating compression and decompression of the body. In some examples, as shown in FIG. 2, the massage device 2 is configured to be worn so as to surround a part of the body B of the subject, compress the body B from the periphery of the body B, and then release the compression. The massage device 2 includes a first massage device 21 (right leg massage device) that is worn so as to surround the right leg and a second massage device 22 (groin massage device) that is worn so as to surround the vicinity of the groin.

The first massage device 21 includes bladders (e.g., inflatable bladders) 201 to 212, first hoses H1 (e.g., communication portion or communication path or air supply tube), and a first identification unit 25A. The bladders 201 to 212 are supplied with high-pressure gas and expand, and are exhausted with high-pressure gas and contract. Each of the bladders 201 to 212 is formed as a substantially cylindrical bag body so as to surround a portion of the body B to be massaged. The shape and size of the bladders 201 to 212 can be appropriately determined according to the site of the body B to be worn. The bladders 201 to 212 are formed of, for example, a resin material. The materials of the bladders 201 to 212 are not particularly limited as long as they have airtightness for storing high-pressure gas and can be deformed by supply and exhaust of the high-pressure gas. In some examples, the massage device 2 may form a single inflatable bladder.

The first hoses H1 are flexible tubular members that communicate with each of the bladders 201 to 212 and are fluidly connected to the air supply/exhaust device 3. One ends of the first hoses H1 are connected to the bladders 201 to 212, and the other ends of the first hoses H1 are connected to the air supply/exhaust device 3. The first hoses H1 and the air supply/exhaust device 3 are connected through a connector C1. For example, a first connection part (or connector end) C11 is formed at the other ends of the first hoses H1, a second connection part (or connector port) C12 is formed in the air supply/exhaust device 3, and the first connection part C11 and the second connection part C12 are connected so that the bladders 201 to 212 and the air supply/exhaust device 3 are in fluid communication with each other.

As described above, the first massage device 21 is fluidly connected to the air supply/exhaust device 3 by fluidly connecting the bladders 201 to 212 to the air supply/exhaust device 3 through the first hoses H1. In the first massage device 21, each of the bladders 201 to 212 compresses the corresponding portion of the body B by expanding, and each of the bladders 201 to 212 releases the compression of the body B by contracting.

The first identification unit 25A is a radio frequency (RF) tag, and is mounted on the first connection part C11. The RF tag also referred to herein as a radio-frequency identification (RFID) tag is a storage medium capable of reading and writing information. In the first identification unit 25A, at least information on the type of the first massage device 21 and information (identification information) on an individual number for individually identifying the first massage device 21 are stored. Information stored in the first identification unit 25A is read by performing wireless communication with recognition unit 35 (first recognition unit 35A) provided in an air supply/exhaust device 3, which will be described in detail later.

The second massage device 22 includes bladders 213 to 216 and second hoses H2 (e.g., communication portion or communication path or air supply tube). Similarly to the bladders 201 to 212, the bladders 213 to 216 are expanded by being supplied with high-pressure gas, and are contracted by being discharged with high-pressure gas. Other features such as shapes are similar to those of the bladders 201 to 212, and thus explanation thereof will be omitted here.

The second hoses H2 are flexible tubular members that communicate with each of the bladders 213 to 216 and are fluidly connected to the air supply/exhaust device 3. One ends of the second hoses H2 are connected to the bladders 213 to 216 and the other ends of the second hoses H2 are connected to the air supply/exhaust device 3. The second hoses H2 and the air supply/exhaust device 3 are connected through a connector C2. For example, a first connection part C21 is formed at the other ends of the second hoses H2, a second connection part C22 is formed at the air supply/exhaust device 3, and the first connection part C21 and the second connection part C22 are connected so that the bladders 213 to 216 and the air supply/exhaust device 3 are in fluid communication with each other.

As such, the second massage device 22 is fluidly connected to the air supply/exhaust device 3 by the bladders 213 to 216 being fluidly connected to the air supply/exhaust device 3 through the second hoses H2. In the second massage device 22, each of the bladders 213 to 216 compresses the corresponding portion of the body B by expanding, and each of the bladders 213 to 216 releases the compression of the body B by contracting.

The second identification unit 25B is a radio frequency tag, and is mounted on the first connection part C21. The RF tag is a storage medium capable of reading and writing information. In the second identification unit 25B, at least information related to the type of the second massage device 22 and identification information related to an individual number for individually identifying the second massage device 22 are stored. Information stored in the second identification unit 25B is read by performing wireless communication with a recognition unit 35 (second recognition unit 35B) provided in the air supply/exhaust device 3, which will be described in detail later.

The air supply/exhaust device 3 supplies high-pressure gas to at least one of the bladders 201 to 216 and exhausts high-pressure gas from at least one of the bladders 201 to 216. As shown in FIG. 1, the air supply/exhaust device 3 includes an air pump 4, an air distribution valve unit 5, a main valve unit 6 connected to the air distribution valve unit 5, a control unit 7, a display operation unit (e.g., a display screen) 31, and a housing 33.

The air pump 4 is a device that supplies high-pressure gas to the air distribution valve unit 5 and exhausts gas from the air distribution valve unit 5. The air pump 4 may include, for example, a pump that sends out high-pressure gas, a cylinder from which high-pressure gas is ejected by opening a valve, and the like. As shown in FIG. 2, the air pump 4 includes a main body 4*a*, a supply port 4*b* for supplying gas from the main body 4*a* to an outside, and an inlet port 4*c* for sucking gas from the outside to the main body 4*a*. Each of the supply port 4*b* and the inlet port 4*c* is connected to an air distribution valve unit 5.

For example, the air pump 4 supplies gas to the main valve unit 6 through the supply port 4*b* and the air distribution valve unit 5 (gas supply operation). At this time, the air pump 4 sucks gas from the outside through the inlet port 4*c* and the air distribution valve unit 5. Further, the air pump 4 sucks gas from the main valve unit 6 through the inlet port 4*c* and the air distribution valve unit 5. At this time, the air pump 4 supplies (exhausts) gas to the outside through the supply port 4*b* and the air distribution valve unit 5 (forced decompression operation). Details of the gas supply operation and the forced decompression operation will be described later.

The air distribution valve unit 5 is connected to the air pump 4. The air distribution valve unit 5 is a device that controls supply of high-pressure gas to the main valve unit 6 and exhaust gas from the main valve unit 6. The air distribution valve unit 5 is, for example, a device that switches a flow path between the air pump 4 and the main valve unit 6 to a flow path of gas from the air pump 4 to the main valve unit 6, a flow path of gas from the main valve unit 6 to the air pump 4, or the like. The air distribution valve unit 5 is located downstream of the air pump 4 and upstream of the main valve unit 6.

As illustrated in FIGS. 1 to 4B, the air distribution valve unit 5 includes a main body 50, a first free port FP1, a second free port FP2, a first connection port P1, a second connection port P2, a third connection port P3, a fourth connection port P4, a first switching mechanism 51, and a second switching mechanism 52. The main body 50 is a housing in which the first free port FP1, the second free port FP2, the first connection port P1, the second connection port P2, the third connection port P3, the fourth connection port P4, the first switching mechanism 51, and the second switching mechanism 52 are formed.

The air distribution valve unit 5 includes a first portion 5*a* and a second portion 5*b* independent from each other. For example, the internal space of the first portion 5*a* and the internal space of the second portion 5*b* are partitioned from each other. The first portion 5*a* includes a chamber CA1, the first free port FP1 connected to the supply port 4*b* of the air pump 4, the first connection port P1 connected to the main valve unit 6, the second connection port P2 connected to the outside, and the first switching mechanism 51 that controls opening and closing of the first connection port P1 and opening and closing of the second connection port P2. The second portion 5*b* includes a chamber CA2 different from the chamber CA1, the second free port FP2 connected to the inlet port 4*c* of the air pump 4, the third connection port P3 connected to the main valve unit 6, the fourth connection port P4 connected to the outside, and the second switching mechanism 52 that controls opening and closing of the third connection port P3 and opening and closing of the fourth connection port P4. The outside of the air distribution valve unit 5 is, for example, the outside air of the air supply/exhaust device 3.

The first switching mechanism 51 is a mechanism for switching the flow path of the gas flowing into the chamber CA1 of the first portion 5*a*, and includes a first solenoid valve V1 for opening and closing the first connection port P1 and a second solenoid valve V2 for opening and closing the second connection port P2. The first solenoid valve V1 is a two way port that opens and closes the first connection port P1 by being driven by electricity. The second solenoid valve V2 is a two way port that opens and closes the second connection port P2 by being driven by electricity. In some examples, the first solenoid valve V1 and the second solenoid valve V2 have the same structure.

The second switching mechanism 52 is a mechanism for switching the flow path of the gas flowing into the chamber CA2 of the second portion 5_b_, and includes a third solenoid valve V3 for opening and closing the third connection port P3 and a fourth solenoid valve V4 for opening and closing the fourth connection port P4. In some examples, each of the third solenoid valve V3 and the fourth solenoid valve V4 is a two way port having the same structure as the first solenoid valve V1.

The main valve unit 6 is connected to the air distribution valve unit 5. The main valve unit 6 is a device that switches between a flow path for supplying high-pressure gas to each of the bladders 201 to 216 of the massage device 2 and a flow path for exhausting high-pressure gas from each of the bladders 201 to 216 of the massage device 2 in conjunction with the air distribution valve unit 5.

The main valve unit 6 includes four solenoid valve units 61 to 64. Each of the solenoid valve units 61 to 64 has the same structure as the air distribution valve unit 5. Therefore, each of the solenoid valve units 61 to 64 includes two chambers, two free ports FP3 and FP4, four connection ports P1 to P4, and four solenoid valves V11 to V14.

As shown in FIG. 2, both of the free ports FP3 and FP4 included in the solenoid valve unit 61 are mutually connected to the first connection port P1 and the third connection port P3 of the air distribution valve unit 5. The connection ports P11 to P14 included in the solenoid valve unit 61 are connected to the bladders 201 to 204, respectively. Gas supply to the bladders 201 to 204 and gas exhaust from the bladders 201 to 204 are controlled by solenoid valves V11 to V14 included in the solenoid valve unit 61. Further, for example, connection ports P21 to P24 included in the solenoid valve unit 62 are connected to the bladders 205 to 208, respectively. Similarly, the connection ports P31 to P34 included in the solenoid valve unit 63 are connected to the bladders 209 to 212, respectively, and the connection ports P41 to P44 included in the solenoid valve unit 64 are connected to the bladders 213 to 216, respectively. Opening and closing of each of the connection ports P21 to P24, P31 to P34, and P41 to P44 are controlled by each of the corresponding solenoids valve V21 to V24, V31 to V34, and V41 to V44.

Figure 4A:
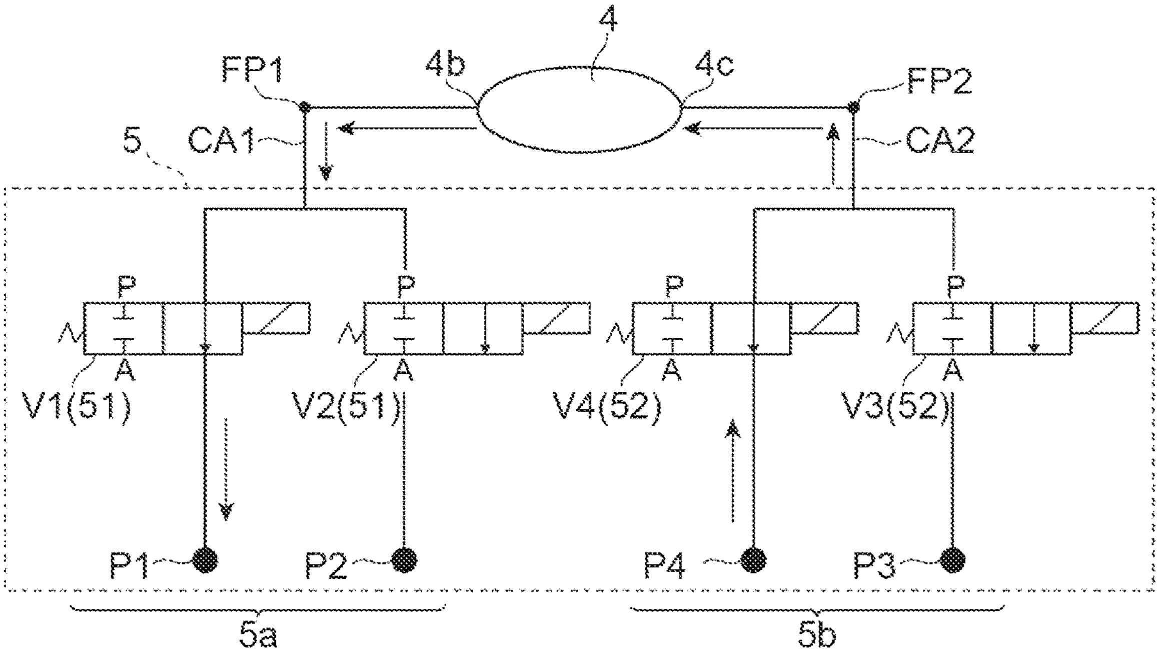
FIGS. 4A and 4B are circuit diagrams of an air pump and an air distribution valve unit.

Next, the operation of the air supply/exhaust device 3 will be described with reference to FIGS. 4A to 5B. First, a gas supply operation to the main valve unit 6 by the air supply/exhaust device 3 will be described. As shown in FIG. 4A, when gas is supplied to the main valve unit 6 by the air pump 4, the first solenoid valve V1 and the fourth solenoid valve V4 are opened, while the second solenoid valve V2 and the third solenoid valve V3 are closed. Therefore, during the gas supply, the first connection port P1 and the fourth connection port P4 are opened, and the second connection port P2 and the third connection port P3 are closed. Accordingly, as indicated by arrows in FIG. 4A, the gas introduced into the air pump 4 from the outside through the fourth connection port P4 is supplied to the main valve unit 6 through the first connection port P1. In some examples, during the gas supply, high-pressure gas is supplied to at least one of the bladders 201 to 216 by the operation of the main valve unit 6, and the gas supply is performed such that each of the bladders 201 to 216 has a desired internal pressure.

Figure 4B:
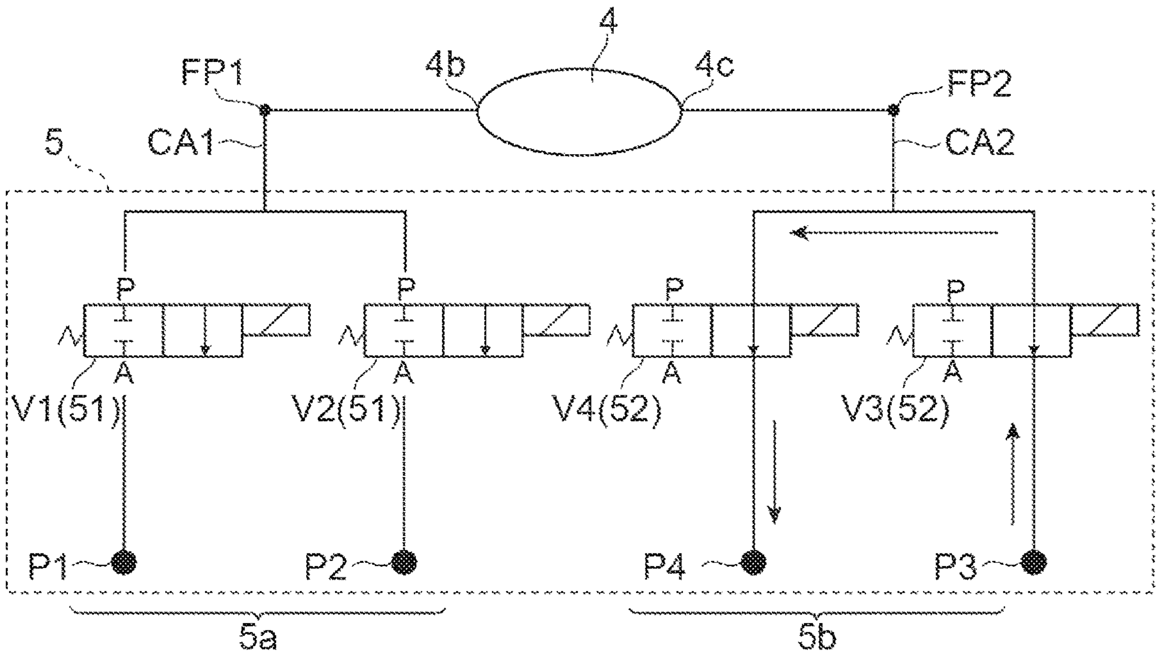

Next, the internal pressure adjustment operation by the air supply/exhaust device 3 will be described with reference to the FIG. 4B. The internal pressure adjustment performed in the internal pressure adjustment operation is, for example, adjustment of the internal pressure of at least one of chambers included in the main valve unit 6, adjustment of the internal pressure of at least one of the bladders 201 to 216, and the like. During the internal pressure adjustment, the air pump 4 is in a suspended state. As shown in the FIG. 4B, during the internal pressure adjustment, the third solenoid valve V3 and the fourth solenoid valve V4 are opened, while the first solenoid valve V1 and the second solenoid valve V2 are closed. Therefore, during the internal pressure adjustment, the third connection port P3 and the fourth connection port P4 are opened, and the first connection port P1 and the second connection port P2 are closed. As a result, gas is exhausted from at least one of the chambers and/or at least one of the bladders 201 to 216 through the third connection port P3 and the fourth connection port P4 as indicated by arrows shown in FIG. 4B. In some examples, during the internal pressure adjustment, the internal pressure of at least one of the chambers and the internal pressure of at least one of the bladders 201 to 216 can be adjusted by the operation of the main valve unit 6.

Figure 5A:
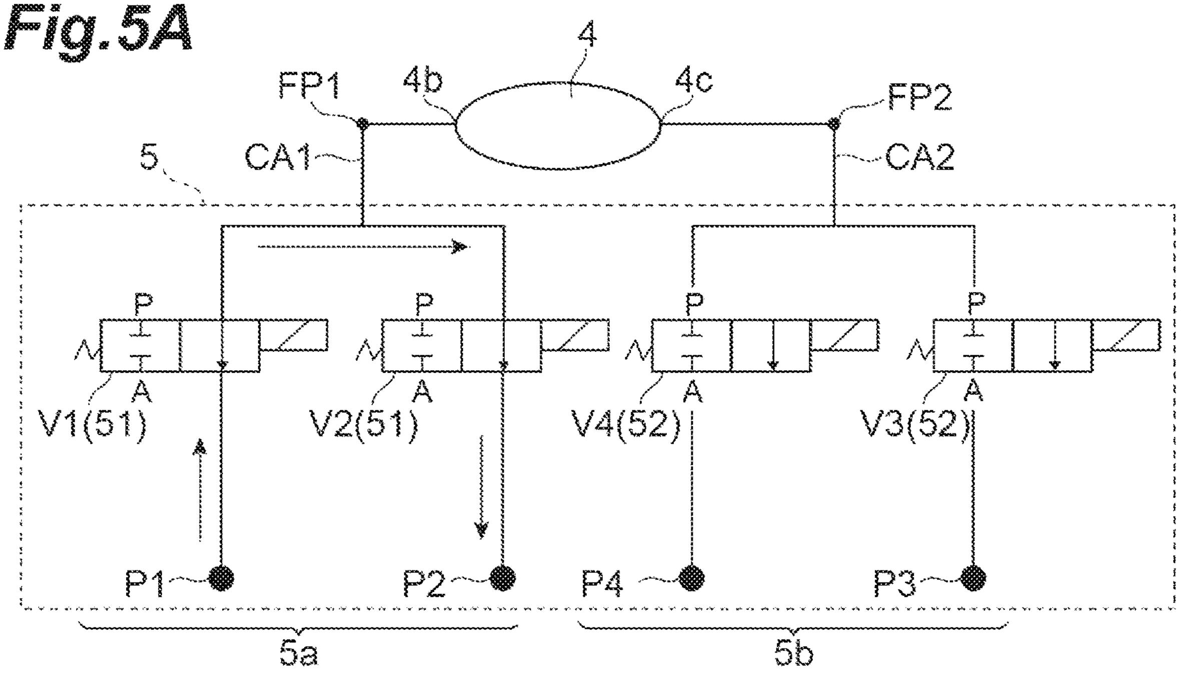
FIGS. 5A and 5B are circuit diagrams of an air pump and an air distribution valve unit.

Next, the natural decompression operation by the air supply/exhaust device 3 will be described with reference to the FIG. 5A. The natural decompression performed in the natural decompression operation is, for example, natural decompression of at least one of chambers included in the main valve unit 6, natural decompression of the internal pressure of at least one of the bladders 201 to 216, or the like. The air pump 4 is suspended during the natural decompression. As shown in FIG. 5A, during the internal pressure adjustment, the first solenoid valve V1 and the second solenoid valve V2 are opened, while the third solenoid valve V3 and the fourth solenoid valve V4 are closed. Therefore, during the natural decompression, the first connection port P1 and the second connection port P2 are opened, and the third connection port P3 and the fourth connection port P4 are closed. As a result, gas is discharged from the chamber and the bladders 201 to 216 through the first connection port P1 and the second connection port P2 as indicated by arrows shown in FIG. 5A. In some examples, during the natural decompression, each chamber and the bladders 201 to 216 are naturally decompressed by the operation of the main valve unit 6.

Figure 5B:
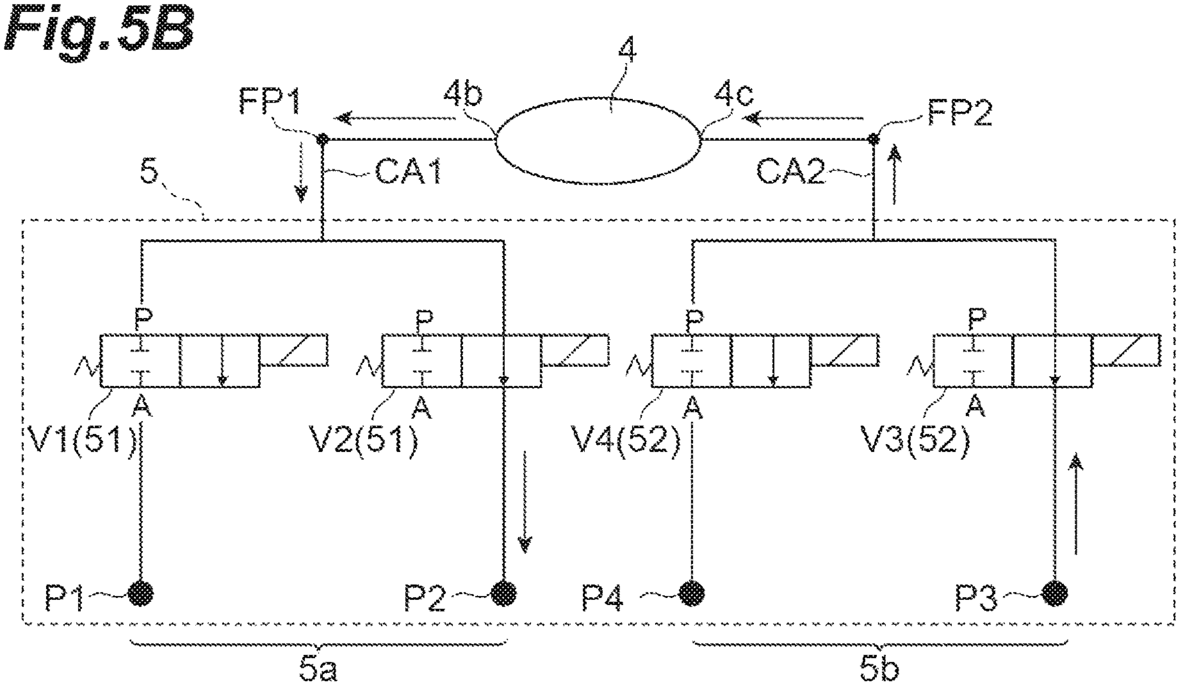

Next, a forced decompression operation by the air supply/exhaust device 3 will be described with reference to FIG. 5B. The forced decompression performed by the forced decompression operation may, for example, forcibly decompress all chambers included in the main valve unit 6 by gas suction of the air pump 4 or may forcibly decompress all the bladders 201 to 216 by gas suction of the air pump 4 in an emergency situation or the like. As shown in FIG. 5B, when the air pump 4 sucks gas, the second solenoid valve V2 and the third solenoid valve V3 are opened, while the first solenoid valve V1 and the fourth solenoid valve V4 are closed. Therefore, when the pressure is forcibly decompressed, the second connection port P2 and the third connection port P3 are opened, and the first connection port P1 and the fourth connection port P4 are closed. Accordingly, as indicated by arrows in FIG. 5B, the gas introduced into the air pump 4 from the main valve unit 6 through the third connection port P3 is exhausted to the outside of the air supply/exhaust device 3 through the second connection port P2.

Returning to FIG. 1, the control unit 7 controls the air pump 4, the air distribution valve unit 5, the main valve unit 6, the display operation unit 31, and recognition units 35. The control unit 7 includes, for example, a central processing unit (CPU), a random access memory (RAM), and a read only memory (ROM). The control unit 7 is configured to be capable of executing a control program stored in a ROM, for example. The control program is described so as to operate the air pump 4, the air distribution valve unit 5, and the main valve unit 6 based on a desired order of expanding and contracting the bladders 201 to 216, for example.

The display operation unit (e.g., display screen) 31 displays an operation pattern set in the air supply/exhaust device 3, a type of the massage device 2 read by the recognition units 35 to be described later, identification information, and the like. The display operation unit 31 is provided so as to be capable of receiving various operations of the air supply/exhaust device 3. For example, the display operation unit 31 is provided to be capable of receive a selection of an operation pattern for operating the massage device 2 connected to the air supply/exhaust device 3. Accordingly, the display operation unit 31 may be a device such as a touch screen or the like. Depending on examples, the display screen (e.g., touch screen) may be provided on the massage device 2, and/or on a separate user control device that is in communication with the air supply/exhaust device 3 and/or the massage device 2. In some examples, the information to be displayed may be displayed simultaneously on multiple display screens (e.g., on the display operation unit 31 and on one or more other displays screens of the massage device 2 and/or other device(s)). In some examples, the information to be displayed may be distributed among multiple display screens (e.g., on the display operation unit 31 and on one or more other displays screens of the massage device 2 and/or other device(s)). Depending on examples, the above described display screen may be replaced by or supplemented with any suitable user interface device (e.g., speaker and voice recognition interface) to enable output of information and/or input of user instructions.

The housing 33 houses the air pump 4, the air distribution valve unit 5, the main valve unit 6, and the control unit 7. The housing 33 is provided with the display operation unit 31. Further, the housing 33 is formed with a connecting portion where the massage device 2 is connected to the air supply/exhaust device 3, that is, second connection parts C12 and C22 which are a part of the connector C connecting the hoses H (e.g., communication portions or communication paths or air supply tubes) of the massage device 2 and the air supply/exhaust device 3.

The recognition units 35 are RFID readers/writers capable of reading information stored in an RFID tag and writing information, and are mounted on the second connection parts C12 and C22, respectively. The recognition units 35 include a first recognition unit 35A and a second recognition unit 35B. The first recognition unit 35A reads information stored in the first identification unit 25A mounted on the first connection part C11 (i.e., the first massage device 21) connected to the second connection part C12. The first recognition unit 35A reads information related to the type of the first massage device 21 and information related to an individual number for individually identifying the first massage device 21, which are stored in the first identification unit 25A.

The second recognition unit 35B reads information stored in the second identification unit 25B mounted on the first connection part C21 (i.e., the second massage device 22) connected to the second connection part C22. The second recognition unit 35B reads the information related to the type of the second massage device 22 and the information related to the individual number for individually identifying the second massage device 22 stored in the second identification unit 25B.

In the first recognition unit 35A, the output value of the radio wave is adjusted so that only the first identification unit 25A mounted on the first connection part C11 connected to the second connection part C12 can be read. In the second recognition unit 35B, the output value of the radio wave is adjusted so that only the second identification unit 25B mounted on the first connection part C21 connected to the second connection part C22 can be read. That is, the recognition units 35 are provided so as to recognize the identification units 25 in a state where the second connection parts C11, C21 are connected to the first connection parts C12, C22, respectively, and not to recognize the identification units 25 in a state where the second connection parts C11, C21 are not connected to the first connection parts C12, C22, respectively.

As a configuration in which the first recognition unit 35A reads only the first identification unit 25A and the second recognition unit 35B reads only the second identification unit 25B, instead of or in addition to the adjustment of the output value, the first identification unit 25A and the second identification unit 25B may be spaced apart from each other so that the second identification unit 25B does not enter the magnetic field generated by the first recognition unit 35A and so that the first identification unit 25A does not enter the generated magnetic field generated by the second recognition unit 35B.

In the configuration of the air supply/exhaust device 3 as described above, the control unit 7 determines the presence or absence of connection to the second connection parts C12 and C22 of the massage device 2 and causes the display operation unit 31 (notification unit) to notify (e.g., by outputting a notification message) when it is determined that the connection is disconnected, based on the presence or absence of identification of the identification units 25 by the recognition units 35. The display operation unit 31 may display (report) a notification message indicating that at least one of the connection of the massage device 2 and the disconnection of the massage device 2. Note that the control unit 7 may not only notify at least one of the connection of the massage device 2 and the disconnection of the massage device 2 through the display operation unit 31, but may also notify through a device that generates sound, light, vibration, or the like, for example, or may transmit information notifying this to another terminal device, for example. Depending on examples, the notification message may be output on any suitable user interface device (e.g., speaker and voice recognition interface) to enable output of information and/or input of user instructions. In addition, the notification message may be output to one or more user interface device(s) (e.g., display screen or touch screen) located on the massage device 2 and/or an additional device such as a user control device, for example.

The control unit 7 specifies the type of the massage device 2 based on the identification units 25 recognized by the recognition units 35, and sets at least one operation pattern according to the specified type of the massage device 2. Here, the operation pattern refers to a supply pattern in which the order and amount of gas supply to the bladders 201 to 216 of the massage device 2 and how many repetitions are set, an exhaust pattern in which the order and amount of gas exhaust to the bladders 201 to 216 of the massage device 2 are set, and operation specifications in which the number of repetitions of the supply pattern and exhaust pattern is set. The operation pattern of the massage device 2 can be defined by, for example, a combination of the order of compression, the intensity of compression, and the number of repetition cycles.

Figure 6A:
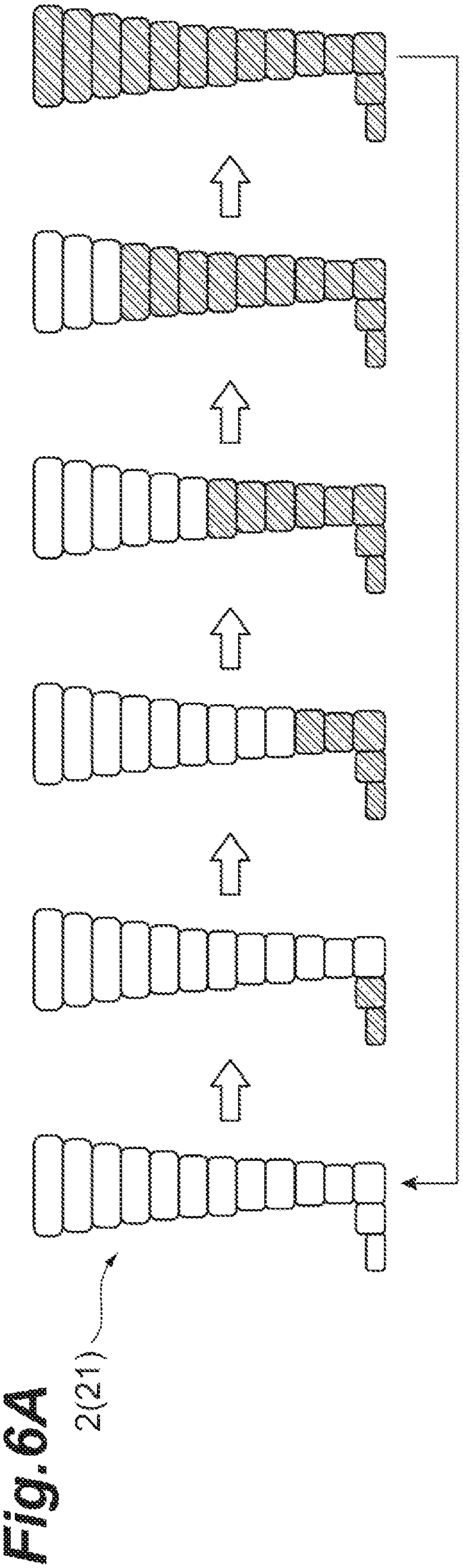
FIGS. 6A and 6B are diagrams illustrating an example operation pattern.
Figure 6B:
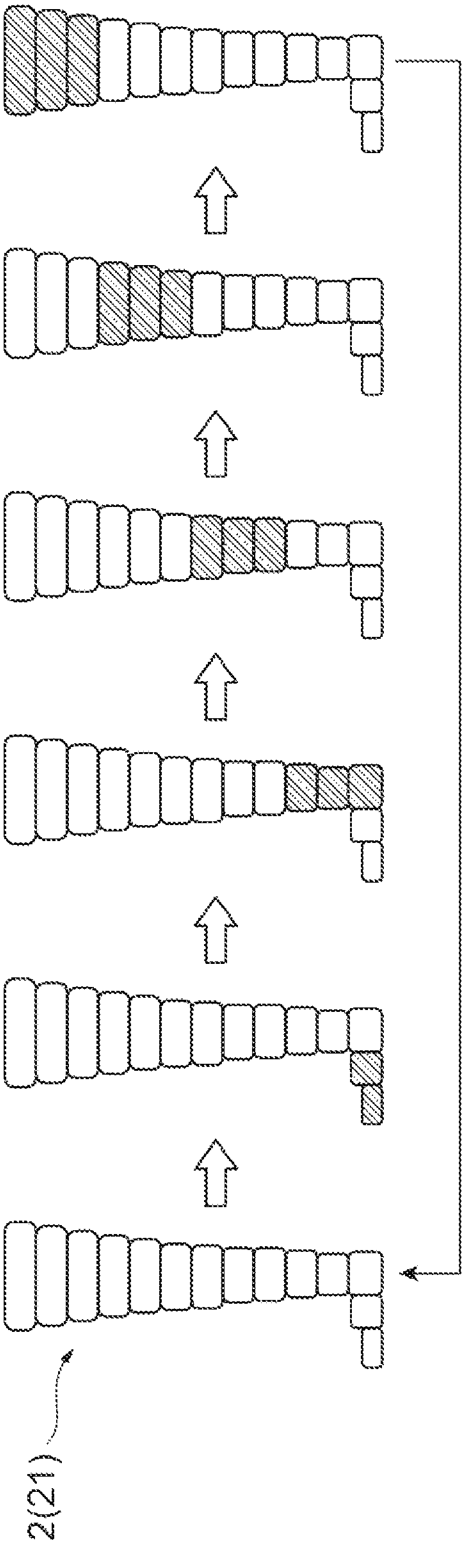

Hereinafter, an operation pattern in a case where massage is applied to the body in order to improve the flow of blood and/or lymph will be described as an example. As the order of compression, there is a pattern in which the body is compressed in order from the tip end portion of the four limbs toward the trunk (heart). As an example of an operation pattern by the first massage device 21 (right leg massage device) corresponding thereto, there is a pattern (so-called "squeeze-mode") in which the bladders are sequentially expanded from the bladder 201 corresponding to the distal end portion of the limb to the bladder 206 corresponding to the end portion on the body side, and the expansion of the other bladders 201 to 212 is maintained until the bladder 206 is completely expanded, as shown in FIG. 6A. As an example of the operation pattern by the first massage device 21 (massage device for right leg), there is a pattern (so-called "wave-mode") in which the bladders are expanded in order from the bladder 201 corresponding to the tip of the limb to the bladder 206 corresponding to the end on the body side, the expanded state of the expanded bladder is held for a certain time (the expanded bladder is once held), and then the bladder is contracted in the order of expansion, as shown in FIG. 6B. The side or portion closer to the body may be referred to as "body side."

The intensity of compression can be set to a value of about 20 mmHG to 60 mmHG as an operation pattern. The number of repetition cycles can be set to a value of about 10 to 100 times as an operation pattern. The number of repetition cycles can also be set, for example, by setting the operating time. The operation time can be set to a value of about 10 minutes to 60 minutes as an operation pattern. For example, assuming that one cycle requires 1.5 minutes, by setting an operation time of 10 minutes, 7 cycles are set as the number of repetition cycles.

Similarly to the operation pattern of the first massage device 21, the operation pattern of the second massage device 22 (groin massage device) can be set by a combination of, for example, the order of compression, the intensity of compression, and the number of repetition cycles as described above.

The control unit 7 includes a memory unit (storage device) in which a plurality of operation patterns are stored, and sets one operation pattern that can be used based on the type of the massage device 2 specified based on the identification units 25 recognized by the recognition units 35. In detail, when the first massage device 21 is connected to the air supply/exhaust device 3, the information about the individual number stored in the identification units 25 is read by the recognition units 35, and one operation pattern that can be used by the first massage device 21 is set based on the read individual number.

When the first massage device 21 is connected to the air supply/exhaust device 3, the control unit 7 may set (temporarily set) a plurality of operation patterns that can be used by the first massage device 21. In this case, the control unit 7 causes the display operation unit 31 to display a selection screen of a plurality of temporarily set operation patterns. The control unit 7 controls to accept selection of one operation pattern through the display operation unit 31. The control unit 7 sets one operation pattern selected through the display operation unit 31 as an operation pattern to be actually operated.

In addition, the information stored in the identification units 25 may include information for distinguishing between medical use and home use. Basically, the operation pattern (order of compression) which can be used for both medical use and home use is the same. However, the control unit 7 enables the user (that is, medical staff) to select a part of the operation pattern such as the intensity of compression and the number of repetition cycles for medical use. The operation pattern can be selected by an operation in the display operation unit 31. On the other hand, for home use, the operation can be performed only by the operation pattern set by the control unit 7 at the time of connection, and the display operation unit 31 can perform only limited operations such as start and stop. For example, for home use, only operation in operation patterns (one of several operation patterns) determined to be appropriate by a doctor based on the doctor's determination and symptoms is allowed. The operation pattern of the intensity of compression and the number of repetition cycles may be set based on information written in the identification units 25. In this manner, the function of the massage device 2 may be adapted for home use, to prevent the user (that is, the person who receives the treatment) from using the massage device 2 incorrectly, for increased safety.

As described above, the recognition units 35 read the information related to the individual number for individually identifying the massage device 2 stored in the identification units 25. The control unit 7 may limit the one or more operation pattern(s) that can be selected from a plurality of operation patterns in accordance with information regarding the acquired individual number. For example, even when two operation patterns are preset based on the type of the first massage device 21, there is a first massage device 21 in which two operation patterns can be executed, there is a first massage device 21 in which only one of the operation patterns can be executed.

The control unit 7 independently sets an operation pattern for each massage device 2 connected to each of the second connection parts C12 and C22. For example, the control unit 7 specifies the type of the first massage device 21 connected to the second connection part C12, specifies the type of the second massage device 22 connected to the second connection part C22, and sets an operation pattern for each of the first massage device 21 and the second massage device 22.

The control unit 7 controls the air pump 4, the air distribution valve unit 5, and the main valve unit 6 based on the operation pattern set in each of the first massage device 21 and the second massage device 22 so that gas can be supplied and exhausted according to the operation pattern.

Figure 7:
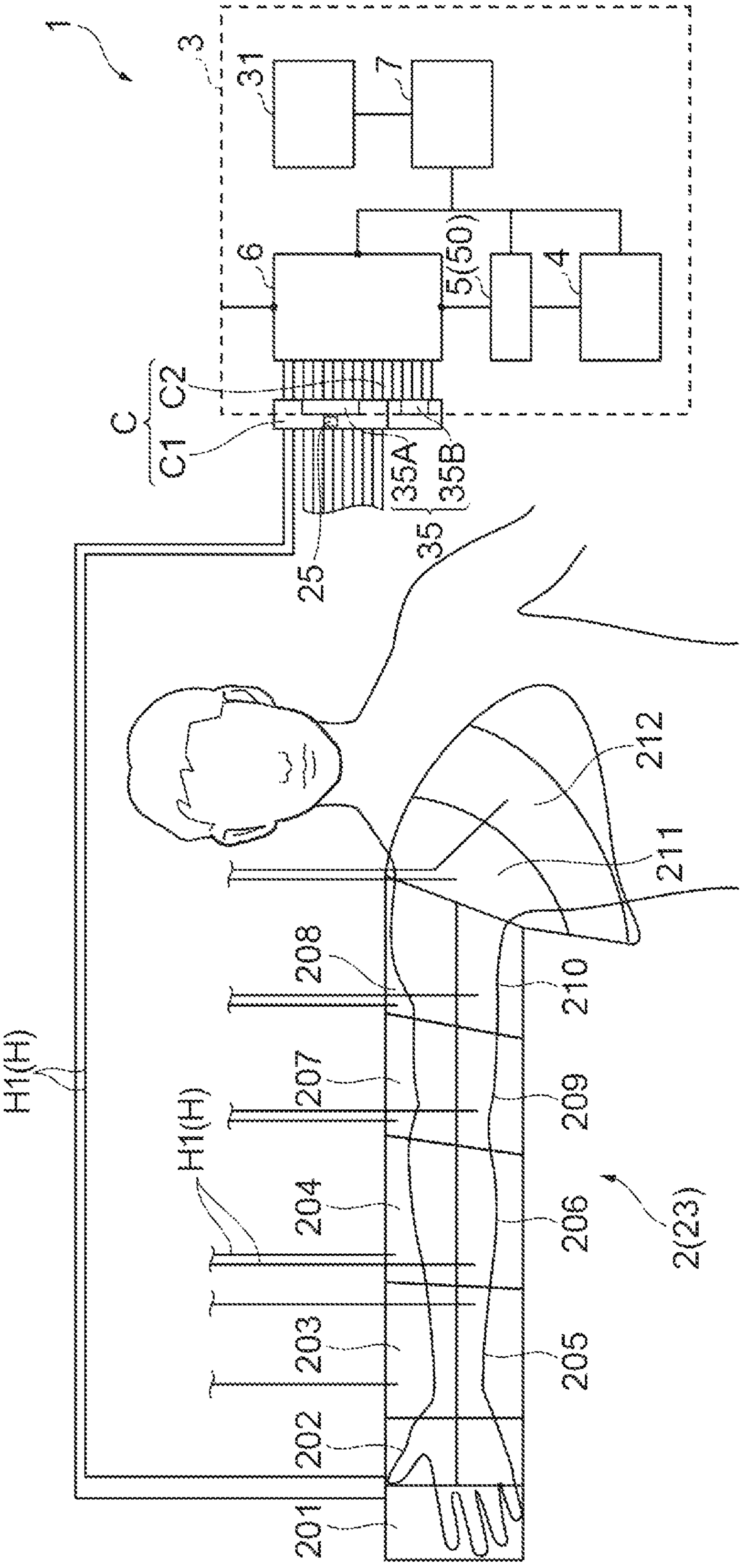
FIG. 7 is a schematic diagram when an example air supply/exhaust system is connected to another massage device.

In the above-described configuration, for example, as illustrated in FIG. 7, it is assumed that a third massage device 23 mounted to surround the right arm is connected to the connector C1 of the air supply/exhaust device 3, and no massage device is connected to the connector C2 of the air supply/exhaust device 3. In this case, the first recognition unit 35A recognizes an identification unit 25 mounted on the third massage device 23 connected to the connector C1 of the air supply/exhaust device 3. The control unit 7 sets an operation pattern based on information about the type of the third massage device 23 and information about an individual number for individually identifying the third massage device 23 stored in the identification unit 35A and recognized by the recognition unit 25. The control unit 7 controls the air supply/exhaust device 3 (the air pump 4, the air distribution valve unit 5, and the main valve unit 6) based on the set operation pattern. Note that the operation pattern of the third massage device 23 includes a pattern in which the body is compressed in order from the hand tip toward the body (heart), and in this case as well, there are a "squeeze-mode" and a "wave-mode", for example.

In addition, the control unit 7 stores a plurality of operation patterns as setting candidates in response to the type of the specified massage device 2, and controls so as to be capable of receiving selection of one operation pattern from the plurality of operation patterns that have been set. In addition, the control unit 7 may limit the one or more operation pattern(s) that can be selected from a plurality of operation patterns in accordance with information related to the acquired individual number.

Furthermore, when the identification unit 25 is not recognized by the second recognition unit 35B, the control unit 7 determines that the massage device 2 is not connected to the connector C2.

The operation and effect of the air supply/exhaust device 3 of some examples will be described. The example recognition units 35 of the air supply/exhaust device 3 may recognize the identification unit 25 provided in the massage device 2 by wireless communication, to reduce errors in determining the type of the massage device 2 that may otherwise occur due to a failure caused by mechanical wear or deterioration over time which may in turn present a safety hazard to users. Moreover, according to examples of the method of recognizing the identification unit 25 by wireless communication, more types of massage devices may be determined, in comparison to cases in which the type is determined by mechanically preparing massage devices 2 having different shapes of connector ends.

In some examples, the control unit 7 of the air supply/exhaust device 3 may store a plurality of operation patterns as setting candidates according to the type of the specified massage device 2, and may be provided to be capable of receiving selection of one operation pattern from among the plurality of operation patterns that have been set. In this configuration, a plurality of automatically selectable operation patterns are set based on the type of massage device 2 specified by the control unit 7. The user can arbitrarily select a pattern from a plurality of set operation patterns.

In some examples, in the control unit 7 of the air supply/exhaust device 3, selectable pattern(s) among a plurality of operation patterns are limited according to the acquired identification information. In this configuration, a plurality of operation patterns that can be automatically selected are set based on the type of the massage device 2 specified by the control unit 7, but operation pattern(s) that can be selected (used) are limited based on the identification information recognized by the recognition units 35. Accordingly, for example, one or more functions that can be used are set for each user having a different treatment policy, to prevent the treatment (operation) from being performed incorrectly.

The air massager system 1 may be used as, for example, "for medical treatment" for a medical institution or "for home treatment" for a home treatment patient. When used as "medical", all setting functions are used, such as pressure setting and pressure sequence. However, in the case of being used as "home use," the treatment patient himself/herself operates. Thus, there is a risk of treatment due to an erroneous operation if all setting functions become available in the same manner as "medical use." In this regard, in the above-described air supply/exhaust device 3, the treatment policy of the doctor is stored in the identification unit 25, and the control unit 7 limits the operation pattern(s) that can be used based on the information stored in the identification unit 25 recognized by the recognition units 35, to prevent an incorrect operation of the massage device 2.

In some examples, the recognition units 35 of the air supply/exhaust device 3 are provided so as to be capable of recognizing the identification units 25 provided in the first connection parts C11 and C21, respectively. In this configuration, since the identification units 25 of the massage device 2 connected to the first connection parts C12, C22 through the second connection parts C11, C21 are recognized, the type of the massage device 2 connected to the air supply/exhaust device 3 can be specified. In other words, the recognition units 35 do not erroneously read the identification units 25 of the massage device 2 that are close to the recognition units 35 and that are not connected to the connector C. Therefore, the recognition units 35 can automatically read the identification unit 25 of the massage device 2 only by connecting the massage device 2 to the connector C without performing an operation of notifying the control unit 7.

In some examples, the recognition units 35 of the air supply/exhaust device 3 may communicate with the identification units 25 through short-range wireless communication (via a short-range wireless communication protocol), and the recognition units 35 may be provided to recognize the identification units 25 in a state in which the second connection parts C11 and C21 are connected to the first connection parts C12 and C22, and not to recognize the identification units 25 in a state in which the second connection parts C11 and C21 are not connected to the first connection parts C12 and C22, respectively. In this configuration, the recognition unit 35 and/or the control unit 7 may determine whether or not the massage device 2 is connected to the air supply/exhaust device 3, in order to detect an abnormality in a case where the massage device 2 is detached during treatment.

In some examples, the control unit 7 of the air supply/exhaust device 3 determines the presence or absence of connection to the second connection parts C12 and C22 of the massage device 2, and notifies the display operation unit 31 when it is determined that the connection is disconnected, based on the presence or absence of identification of the identification unit 25 by the recognition units 35, in order to notify the user that the massage device 2 is detached.

In some examples, the control unit 7 of the air supply/exhaust device 3 sets an operation pattern independently for the first massage device 21 and the second massage device 22 connected to the second connection parts C12 and C22, respectively, to cause the first massage device 21 and the second massage device 22 mounted on different parts of the body of the user to perform different operations, so as to reduce the number of air supply/exhaust device 3. In some examples, a single air supply/exhaust device 3 may be used to operate the various massage devices instead of using multiple air supply/exhaust devices 3.

Although examples have been described above, the present disclosure is not limited to the above-described examples. Various modifications can be made without departing from the spirit of the disclosure.

First Modification

In some examples, the connectors C1 and C2 for connecting the two massage devices 2 and 2 are provided. In such a configuration, the control unit 7 sets the operation pattern according to the type of the massage device 2 specified by communication between the identification unit 25 and the recognition units 35 provided in the massage device 2. In addition to this configuration, in accordance with the type of the massage device 2 specified by the massage device 2 connected to one of the connectors C1 and C2, the control unit 7 may determine or limit the operation pattern of the massage device 2 connected to the other of the connectors C1 and C2.

Figure 8A:
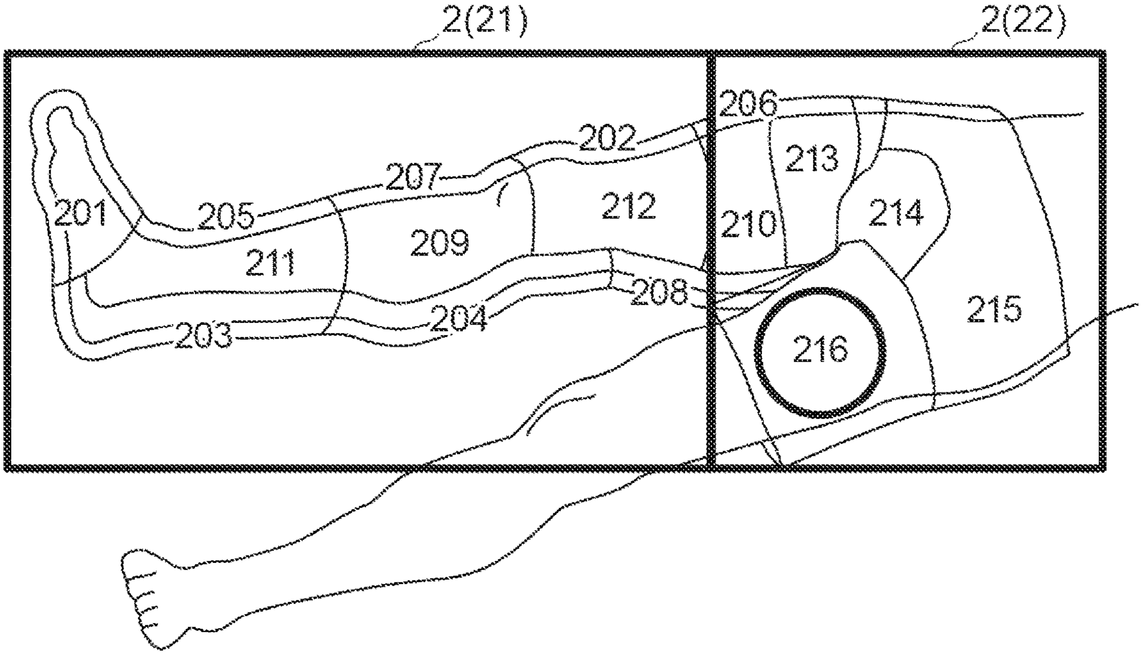
FIGS. 8A and 8B are diagrams illustrating restriction of operation of an example air supply/exhaust system.
Figure 8B:
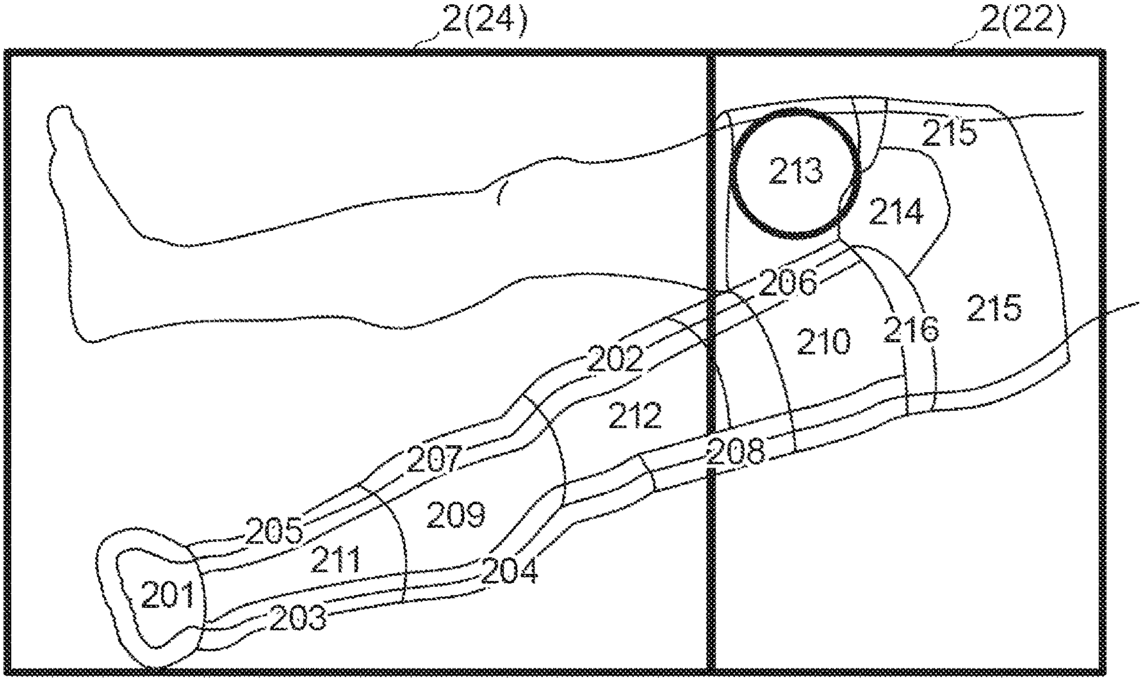

For example, the operation pattern set in the second massage device 22 is different between the case where the first massage device 21 is connected to the connector C1 and the second massage device 22 is connected to the connector C2 as shown in FIG. 8A, and the case where a first massage device 24 is connected to the connector C1 and the second massage device 22 is connected to the connector C1 as shown in FIG. 8B. For example, when a first massage device 21 is connected to the connector C1 and a second massage device 22 is connected to the connector C2, an operation pattern which limits supply of high-pressure gas to the bladder 216 (the portion surrounded by a circle shown in FIG. 8A) of the second massage device 22 is set. In addition, as illustrated in FIG. 8B, when the first massage device 24 is connected to the connector C1 and the second massage device 22 is connected to the connector C2, an operation pattern which limits supply of high-pressure gas to the bladder 213 (the portion surrounded by a circle shown in FIG. 8B) of the second massage device 22 is set.

With such a configuration of the first modification, when one of the left and right legs is massaged, the other of the left and right legs can be prevented from stagnating. Moreover, in the configuration of the first modification, the operation pattern as described above is set without the user particularly performing the setting for increased safety in case the user forgets the setting or selects an incorrect setting.

Second Modification

Instead of or in addition to the configuration of the first modification added to one example, in accordance with the type of the massage device 2 specified from the massage device 2 connected to one of the connectors C1 and C2, the control unit 7 may determine whether or not the correct massage device 2 (e.g., a compatible massage device 2) is connected to the other of the connectors C1 and C2. The information on the correct combination of the massage device 2 may be stored in the identification units 25 or the control unit 7. This determination result may be notified to the user through the display operation unit 31, so as to prevent the connector C1 and the connector C2 from being connected to massage devices 2 of an incorrect or incompatible combination.

Other Modifications

In the above-described example or modification, an example has been described in which a plurality of operation patterns are stored in advance in the control unit 7, the type of the massage device 2 is specified based on the identification units 25 recognized by the recognition units 35, and one or more operation patterns are set from the plurality of operation patterns stored in the control unit 7 according to the specified type of the massage device. However, the present disclosure is not limited thereto. For example, one or a plurality of operation patterns may be stored (written) in the identification unit 25, the stored operation pattern may be sent to the control unit 7 through the recognition unit (recognition device), and the operation pattern sent to the control unit 7 may be executed.

In some examples, the air supply/exhaust device 3 according to the modifications may include a memory unit (storage device) that stores a use situation (e.g., usage situation) of the massage device 2 connected to the second connection parts C12 and C22 through the first connection parts C11 and C21, in addition to the configuration of the air supply/exhaust device 3. Accordingly, the use situation of the user and the state of the user corresponding to the use situation of the user may be stored.

What is claimed is:

1. An air pump device for a first massage device and a second massage device, the air pump device comprising:
- a first connector port connectable with a first connector end of a first gas supply path of the first massage device;
- a second connector port connectable with a second connector end of a second gas supply path of the second massage device;
- a first recognition device located adjacent to the first connector port and configured to recognize a first identification device located on the first connector end of the first massage device through a short-range wireless communication configured to communicate within a first range that includes the first connector port and that excludes the second connector port;
- a second recognition device located adjacent to the second connector port and configured to recognize a second identification device located on the second connector end of the second massage device through a short-range wireless communication configured to communicate within a second range that includes the second connector port and excludes the first connector port; and
- a controller configured to:
  - identify a type of the first massage device based on the first identification device recognized by the first recognition device and a type of the second massage device based on the second identification device recognized by the second recognition device;
  - independently set a first operation pattern in accordance with the type of the first massage device identified and a second operation pattern in accordance with the type of the second massage device identified; and
  - control a supply and withdrawal of gas to the first gas supply path and the second gas supply path which are in fluid communication with respective expandable and contractable bladders of the first massage device and the second massage device, in accordance with the first operation pattern and the second operation pattern, respectively.

2. The air pump device according to claim 1, further comprising a storage device configured to store selectable operation patterns associated with the type of the first massage device,
- wherein the controller is configured to receive a selected operation pattern among the selectable operation patterns to set the first operation pattern.

3. The air pump device according to claim 2,
- wherein the first recognition device is configured to acquire identification information stored in the first identification device of the first massage device, and
- wherein the controller is configured to retrieve the selectable operation patterns among a plurality of operation patterns stored, based on the identification information acquired.

4. The air pump device according to claim 1, wherein the first range is set to include the first identification device in a connected state in which the first connector end of the first massage device is fluidly connected to the first connector port, and to exclude the first identification device in a disconnected state in which the first connector end of the first massage device is not fluidly connected to the first connector port.

5. The air pump device according to claim 4, wherein the first recognition device is configured to determine an absence of connection of the first massage device to the first connector port based on an absence of identification of the first identification device in the first range, and wherein the controller is configured to cause a notification device to generate a notification in response to a determination that the the first connector end of the first massage device is disconnected from the first connector port, based on the absence of connection determined by the first recognition device.

6. The air pump device according to claim 1, further comprising a storage device configured to store a usage state of the first massage device connected to the first connector port through the first connector end of the first massage device.

7. The air pump device according to claim 1, wherein the first recognition device is configured to read first identification information stored in the first identification device of the first massage device to recognize the first identification device, and wherein the second recognition device is configured to read second identification information stored in the second identification device of the second massage device to recognize the second identification device.

8. A system comprising:
the air pump device according to claim 1; and
the first massage device and the second massage device,
wherein the first identification device is formed on an outer surface of the first connector end so as to be exposed when the first connector end is connected to the first connector port of the air pump device, and
wherein the second identification device is formed on an outer surface of the second connector end so as to be exposed when the second connector end is connected to the second connector port of the air pump device.

9. An air pump device for a plurality of massage devices, comprising:
a pump configured to exchange a gas with an inflatable bladder of a first massage device via a first air supply tube of the first massage device, and with an inflatable bladder of a second massage device via a second air supply tube of the second massage device;
a first connector port connectable with a first connector end of the first air supply tube of the first massage device;
a second connector port connectable with a second connector end of the second air supply tube of the second massage device;
a first recognition device configured to acquire a type of the first massage device from a first identification device located on the first connector end of the first air supply tube, via a short-range wireless communication configured to communicate within a first range that includes the first connector port and that excludes the second connector port;
a second recognition device configured to acquire a type of the second massage device from a second identification device located on the second connector end of the second air supply tube, via a short-range wireless communication configured to communicate within a second range that includes the second connector port and that excludes the first connector port; and
a controller configured to:
independently set a first operation pattern based on the type of the first massage device and a second operation pattern based on the type of the second massage device; and
control the pump based on the first operation pattern and the second operation pattern.

10. The air pump device according to claim 9, further comprising a storage device configured to store first selectable operation patterns associated with the type of the first massage device and second selectable operation patterns associated with the type of the second massage device, wherein the controller is configured to set the first operation pattern based on a selection from among the first selectable operation patterns, and to set the second operation pattern based on a selection from among the second selectable operation patterns.

11. The air pump device according to claim 10,
wherein the storage device is configured to store a plurality of operation patterns including the first selectable operation patterns and the second selectable operation patterns,
wherein the first recognition device is configured to acquire first identification information stored in the first identification device of the first massage device,
wherein the second recognition device is configured to acquire second identification information stored in the second identification device of the second massage device, and
wherein the controller is configured to retrieve the first selectable operation patterns from among the plurality of operation patterns stored in the storage device based on the first identification information acquired, and to retrieve the second selectable operation patterns from among the plurality of operation patterns, based on the second identification information acquired.

12. The air pump device according to claim 9,
wherein the first recognition device is located adjacent to the first connector port at a distance that is within the first range to communicate with the first identification device when the first connector end of the first massage device is fluidly connected to the first connector port, and
wherein the second recognition device is located adjacent the second connector port at a distance that is within the second range to communicate with the second identification device when the second connector end of the second massage device is fluidly connected to the second connector port.

13. The air pump device according to claim 9,
wherein the first recognition device is further configured to detect a connection of the first connector end of the first massage device with the first connector port when the first connector end is within the first range of the short-range wireless communication of the first recognition device,
wherein the second recognition device is further configured to detect a connection of the second connector end of the second massage device with the second connector port when the second connector end is within the second range of the short-range wireless communication of the second recognition device, and wherein the controller is configured to operate the pump in response to one or more connections detected.

14. The air pump device according to claim 13, wherein the first recognition device is further configured to detect a disconnection of the first connector end of the first massage device from the first connector port based on an absence of communication between the first recognition device and the first identification device, wherein the second recognition device is further configured to detect a disconnection of the second connector end of the second massage device from the second connector port based on an absence of communication between the second recognition device and the second identification device, and wherein the controller is further configured to generate a notification message to be output on a user interface device in response to one or more disconnections detected.

15. The air pump device according to claim 9, wherein the first identification device is a first storage device storing first identification information, wherein the second identification device is a second storage device storing second identification information, wherein the first recognition device is configured to read the first identification information stored in the first storage device of the first massage device, and to identify the type of the first massage device based on the first identification information, and wherein the second recognition device is configured to read the second identification information stored in the second storage device of the second massage device, and to identify the type of the second massage device based on the second identification information.

16. A system comprising:

the air pump device according to claim 9; and the first massage device and the second massage device.

17. The system according to claim 16, wherein the first identification device is formed on an outer surface of the first connector end so as to be exposed when the first connector end is connected to the first connector port of the air pump device, and wherein the second identification device is formed on an outer surface of the second connector end so as to be exposed when the second connector end is connected to the second connector port of the air pump device.

18. The system according to claim 16, wherein the first recognition device is located adjacent to the first connector port at a distance that is within the first range to communicate with the first identification device when the first connector end of the first massage device is connected to the first connector port, and wherein the second recognition device is located adjacent the second connector port at a distance that is within the second range to communicate with the second identification device when the second connector end of the second massage device is connected to the second connector port.

19. The system according to claim 16, wherein the first recognition device is further configured to detect a connection of the first connector end of the first massage device with the first connector port when the first connector end is within the first range of the short-range wireless communication of the first recognition device, wherein the second recognition device is further configured to detect a connection of the second connector end of the second massage device with the second connector port when the second connector end is within the second range of the short-range wireless communication of the second recognition device, and wherein the controller is configured to operate the pump when one or more connections are detected.

20. The system according to claim 19, wherein the first recognition device is further configured to detect a disconnection of the first connector end of the first massage device from the first connector port based on an absence of communication between the first recognition device and the first identification device, wherein the second recognition device is further configured to detect a disconnection of the second connector end of the second massage device from the second connector port based on an absence of communication between the second recognition device and the second identification device, and wherein the controller is further configured to generate a notification message to be output on a user interface device, in response to one or more disconnections detected.

* * * * *